(No Model.)
G. HUNGERFORD & S. H. STILES.
BOX FOR PACKING BUTTER.
No. 313,426. Patented Mar. 3, 1885.
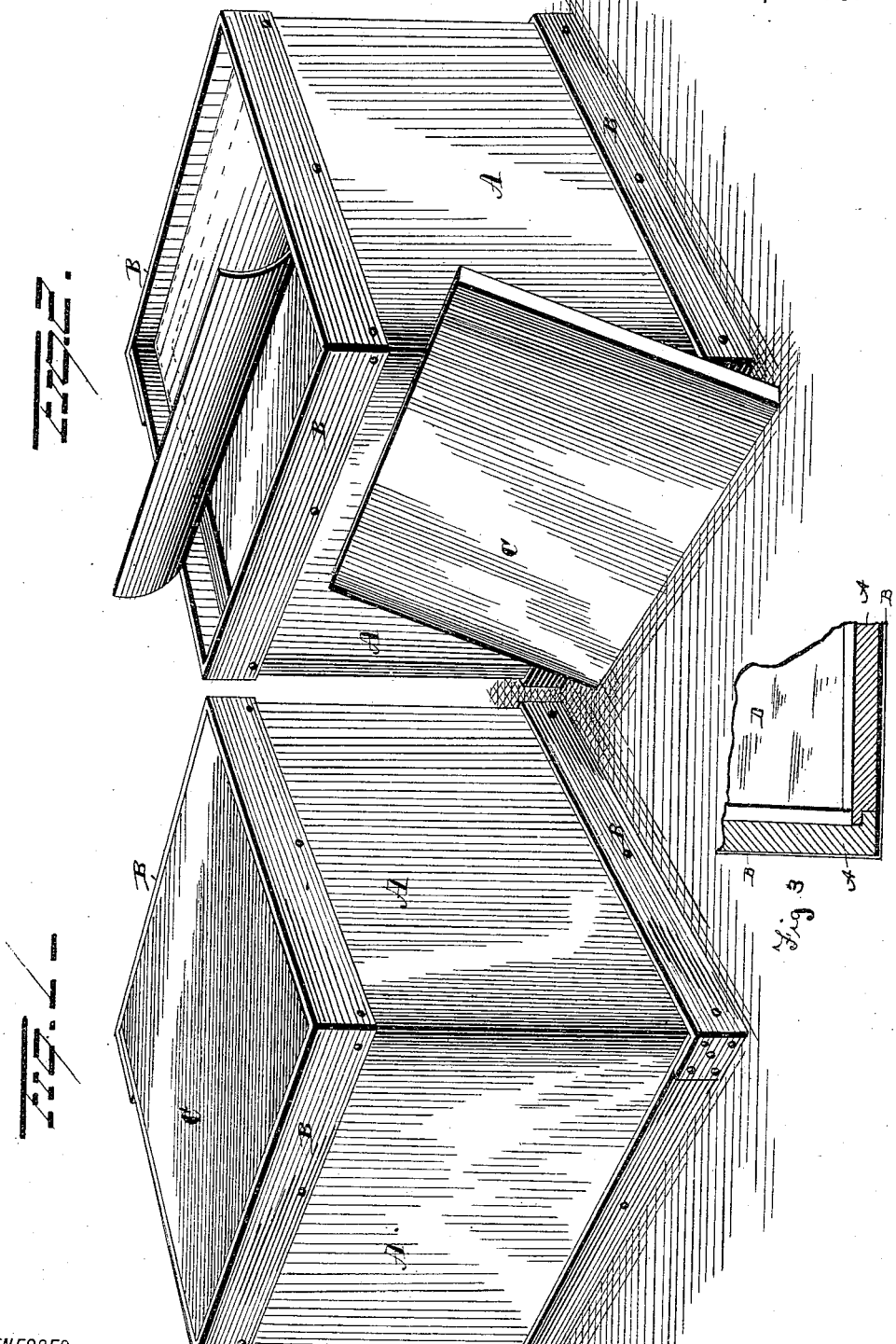

UNITED STATES PATENT OFFICE.

GEORGE HUNGERFORD AND SAMUEL H. STILES, OF GENOA, ILLINOIS; SAID STILES ASSIGNOR TO SAID HUNGERFORD.

BOX FOR PACKING BUTTER.

SPECIFICATION forming part of Letters Patent No. 313,426, dated March 3, 1885.

Application filed August 5, 1884. (No model.)

*To all whom it may concern:*

Be it known that we, GEORGE HUNGERFORD and SAMUEL H. STILES, of Genoa, in the county of De Kalb and State of Illinois, have invented certain new and useful Improvements in Boxes for Packing Butter; and we do hereby declare the following to be a full, clear, and exact description of the invention, such as will enable others skilled in the art to which it appertains to make and use the same.

Our invention relates to an improvement in boxes for packing butter.

Hitherto the boxes constructed for packing butter for shipment or for preserving the same have been found defective on account of the porous quality of the timber and imperfect joints formed in their construction or closing, and on account of the flavor of the wood of which the boxes were constructed being absorbed by the butter, rendering the same rancid in the first instance by exposure more or less to the outside air, and disagreeable to the taste in the second instance.

The object of our present invention is to provide a box for receiving butter which may be constructed of any kind of wood and of any desired size, and which shall be perfectly air-tight and will not impart the least flavor of the wood to the butter. A further object being to construct a durable, convenient, and inexpensive box for the purpose named; and with these ends in view our invention consists in certain features of construction and combinations of parts, as will be hereinafter described, and pointed out in the claim.

In the accompanying drawings, Figure 1 is a view of the box closed. Fig. 2 is a view of the same with cover removed, and Fig. 3 is a view in section showing one manner of joining the sides and bottom.

A represents a rectangular box, constructed of any kind of wood which may be found most convenient on account of its abundance and easy working properties—pine, poplar, basswood, &c., for example. The corners are preferably put together with groove and tongue, and the bottom D let into a groove formed on the inside of the sides to form a good tight joint. The upper and lower ends of the box are bound by metal bands B, preferably of galvanized iron. The lower edge of the lower band is flush with the bottom of the box, while the upper edge of the upper band projects above the top of the box-sides the thickness of the cover C.

The sides and bottom of the box are secured together by nails or screws, and the bands B are secured to the box by a sufficient number of nails or screws to cause the bands to snugly embrace the ends of the box.

To prepare the box for the reception of butter it is immersed in a melted mixture—paraffine, rosin, and beeswax—which adheres to the outer and inner surfaces of the box, filling the crevices and pores in the wood and making the box thereby air-tight, and at the same time preventing the wood from imparting its flavor to the butter when the latter is placed therein. The cover is treated in the same manner as the box, and when the box is filled with butter a sheet of paper or layer of cloth, also treated with the paraffine, rosin, and beeswax, is laid over the top and the cover pressed down within the projecting edge of the upper band B onto the end of the box, and secured in that position by screws, nails, or their equivalents, thus forming a compact package, guarded at all weak points against damage from rough handling, and is furthermore air-tight, and will preserve the butter against becoming rancid, losing flavor, or absorbing wood-taste for a very long period.

Before immersing the box in the mixture of melted paraffine, rosin, and wax, we find it preferable to place the box in a hot air-chamber until it becomes quite well heated, as it will then allow only a thin layer of the mixture to adhere thereto.

The mixture may be applied with a brush or its equivalent, if desired; but this method of applying it does not insure so readily the complete coating of every portion of the box inside and out.

The mixture with which the box is coated also serves to prevent the box from shrinking.

The boxes may be constructed of different sizes and of other shapes than the one represented without departing from the spirit of our invention—for example, octagonal, the frustum of a right pyramid, or cylindrical, or the frustum of a cone; hence we do not wish to restrict ourselves to the exact construction herein set forth; but we are aware that it is not new to coat a box with wax and paraffine or rosin and wax, and hence we make no claim thereto.

Our box, which is preferably angular, as shown, is firmly bound with metallic straps, one of which projects above the box forming a seat for the cover, after which the box and cover are coated inside and out with a mixture of paraffine, wax, and rosin, which hermetically seals the box and prevents the butter from becoming rancid and losing flavor.

This box requires no preparation by soaking before packing the butter and never shrinks or swells, as the coating prevents both the escape or absorption of moisture into the the timber.

Having fully described our invention, what we claim as new, and desire to secure by Letters Patent, is—

As a new article of manufacture, the angular wooden packing-box bound about its upper and lower edges with metallic bands, the upper band projecting above the sides of the box and forming a depressed seat for the removable cover, the said box and cover being coated inside and out with a water-proof composition, substantially as set forth.

In testimony whereof we have signed this specification in the presence of the subscribing witnesses.

GEORGE HUNGERFORD.
SAMUEL H. STILES.

Witnesses:
C. C. M. GRISWELD,
I. HUNGERFORD,
CLINTON J. COOPER,
ELLIS L. COOPER.